United States Patent [19]

Ryan

[11] Patent Number: 5,400,880
[45] Date of Patent: Mar. 28, 1995

[54] BI-LINEAR PLATFORM REACTIVE DAMPER

[75] Inventor: Jeffery S. Ryan, Bernville, Pa.

[73] Assignee: Competition Tire East, Reading, Pa.

[21] Appl. No.: 187,160

[22] Filed: Jan. 27, 1994

[51] Int. Cl.⁶ ............................................. F16F 9/08
[52] U.S. Cl. .............................. 188/314; 188/321.11; 267/218; 267/64.28; 280/710
[58] Field of Search ................ 188/314, 315, 321.11; 267/218, 219, 220, 221, 64.17, 64.28, DIG. 1, DIG. 2, 33; 280/710, 712

[56] References Cited

U.S. PATENT DOCUMENTS

| | | | |
|---|---|---|---|
| 4,616,810 | 10/1986 | Richardson et al. | 267/221 |
| 4,858,898 | 8/1989 | Niikura et al. | 267/218 |
| 5,058,868 | 10/1991 | Sirven | 267/64.26 |
| 5,094,325 | 3/1992 | Smith | 188/314 |

*Primary Examiner*—Matthew C. Graham
*Attorney, Agent, or Firm*—Zachary T. Wobensmith, III

[57] ABSTRACT

A bi-linear platform reactive damper for automotive type vehicles, which includes a damper housing having a chamber with a damper piston in it, which piston has a rod extending from it connected to the suspension of the vehicle, which chamber is filled with hydraulic fluid, the chamber being connected to an external reservoir containing a separator piston, with gas on the side of the piston opposite to the hydraulic fluid, and having an adjustable separator piston stop. The damper housing has a secondary chamber which is in fluid communication with said damper chamber. A movable spring platform is provided, externally mounted to the damper chamber and engaged with said secondary chamber, with a chassis spring mounted between the suspension of an automotive vehicle and engaging the platform, so that upon displacement of the suspension, the rod causes the damper piston to displace hydraulic fluid into the reservoir which causes the separator piston to bottom against the stop which acts to provide a predetermined spring rate for the fluid to work against. Further displacement of the damper piston causes fluid to displace the spring platform compressing the spring increasing the reactive force whereby overall suspension movement is reduced.

5 Claims, 3 Drawing Sheets

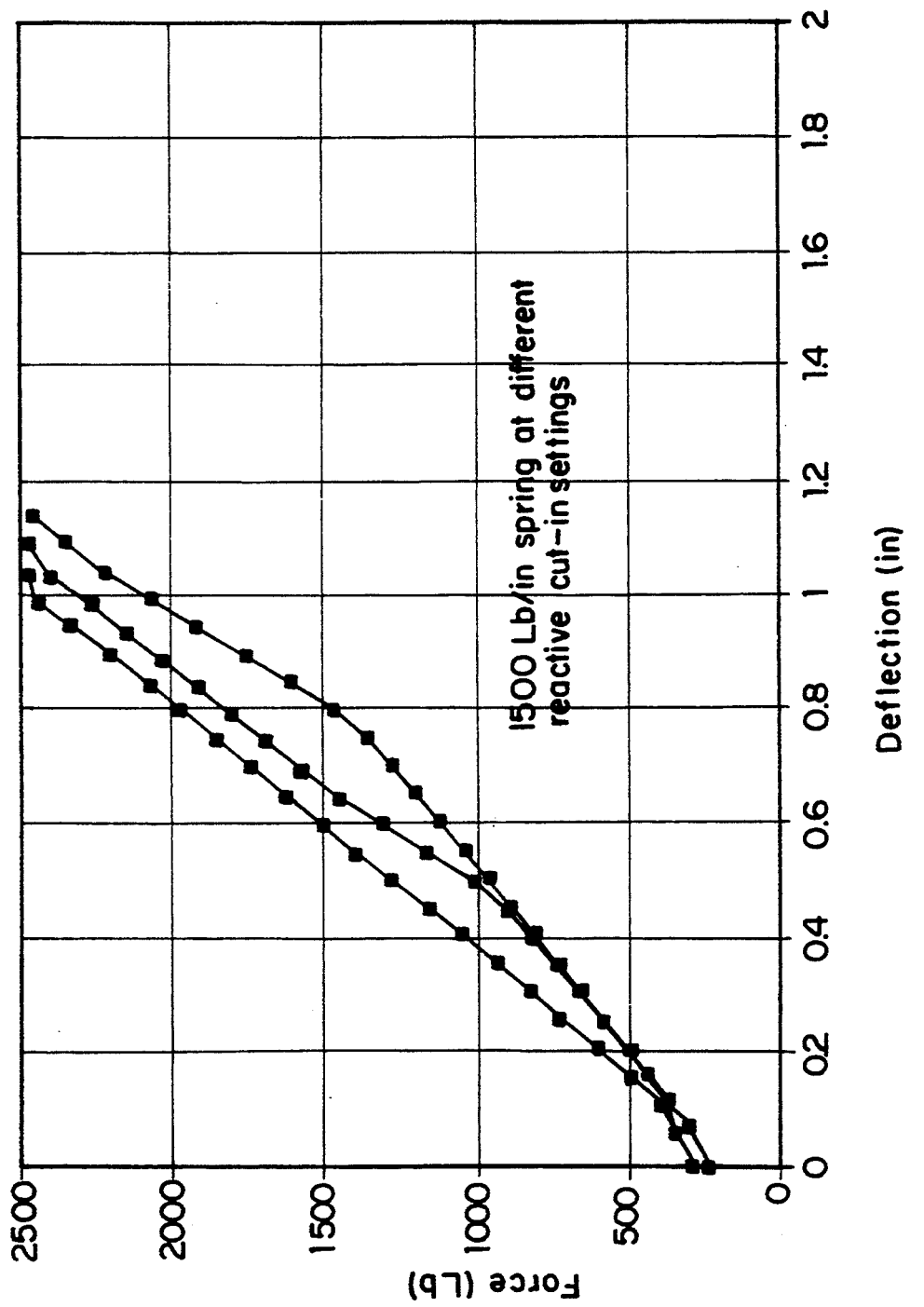

BI-LINEAR PLATFORM REACTIVE DAMPER

FIELD OF THE INVENTION

This invention relates to a bi-linear platform damper of the gas pressurized type for automotive type vehicles which uses displacement of the damper to cause an externally mounted spring to be compressed and to thereby limit suspension movement.

DESCRIPTION OF THE PRIOR ART

As automotive type vehicles such as cars and motorcycles have become more refined with improvements in tires, materials and design it has become apparent that improved control of the overall suspension movement of the vehicle as it travels along a course or around a track is critical to improved performance. For example, many high performance race cars are fitted with a rear wing whose purpose is to cause force to be exerted downwardly on the car as it travels around the track, so that the car attains a predetermined height where the aerodynamic qualities of the car and tire adhesion are maximized. As the car travels along straightaways and around curves, the change in speeds and consequent downward pressure on the rear of the car will cause the suspension height to vary considerably so that handling and other performance characteristics of the car may vary and the optimum height of the car will not be maintained.

To maximize the performance characteristics of the vehicle, the overall suspension movement of the vehicle must be controlled to achieve optimum height at the least expected downward force and maintained at higher forces. A decreased initial spring rate of the supporting chassis springs has been found to achieve the desired control.

There have been various attempts as described in prior art structures to control vehicle suspension movement such as is shown in the U.S. Patents to Monroe U.S. Pat. No. 3,193,239; Thompson No. U.S. Pat. No. 3,603,610; Fukumura U.S. Pat. No. 4,746,106; Nikura et al. U.S. Pat. No. 4,858,898; and Sirven U.S. Pat. No. 5,058,868.

The U.S. Patent to Cislo U.S. Pat. No. 3,195,877 discloses a self-energizing hydraulic leveling device for vehicle suspension which utilizes an externally operated plunger element and dashpot which causes fluid displacement and subsequent spring seat displacement. The Cislo device is not full time, tends to pump up, and the device does not act as a damper but as a mechanical servo valve.

The U.S. Patent to H. Erdmann et al. U.S. Pat. No. 3,538,813 discloses a shock absorber for vehicular suspension systems, which is a position sensitive device, which does not compress, which locks the spring, does not use displacement or compression force to react on the spring to reduce the overall suspension travel and lacks the other features of the invention.

Another method of suspension travel control is to use rubber bumpers which are engaged by the suspension after initial travel and which reduce further travel; however, the contact reaction is abrupt and may produce undesirable results.

The bi-linear platform reactive damper of the invention operates during varying speeds of the vehicle to provide a decreased initial spring rate for control of the vehicle suspension height and has other advantages not found in the prior art.

SUMMARY OF THE INVENTION

A bi-linear platform reactive damper for automotive vehicle which comprises a chamber containing hydraulic fluid with a damper piston therein with a rod connected thereto and to the vehicle which rod is displaceable upon suspension movement, the chamber being connected to a pressurized external reservoir with a separator piston therein with an adjustable stop for the piston, and pressurized gas on the stop side of the piston so that fluid from the damper chamber causes the separator piston to bottom on the stop and further rod displacement causes fluid to displace a spring platform compressing a chassis spring carried outside the chamber, thereby increasing the spring force which results in a decreased initial spring rate, which is bi-linear at various rod positions and which limits overall suspension movement to maintain optimum vehicle height while maintaining complete damping characteristics during varied operating conditions.

The principal object of the invention is to provide a bi-linear platform reactive damper for automotive vehicles which reduces overall suspension movement for varied road and track conditions.

A further object of the invention is to provide apparatus of the character aforesaid which can be used with a wide variety of automotive vehicles.

A further object of the invention is to provide apparatus of the character aforesaid which retains complete damping capabilities throughout vehicle operation.

A further object of the invention is to provide apparatus of the character aforesaid which is capable of adjustment to meet the suspension characteristics of different vehicles.

A further object of the invention is to provide apparatus of the character aforesaid which is simple to install and requires minimum maintenance.

Other objects and advantageous features of the invention will be apparent from the description and claims.

DESCRIPTION OF THE DRAWINGS

The nature and characteristic features of the invention will be more readily understood from the following description when taken in connection with the accompanying drawings in which:

FIG. 3 is a graph illustrating the performance characteristics of the apparatus of the invention.

It should, of course, be understood that the description and drawings herewith are merely illustrative and that various modifications and changes can be made in the structure disclosed without departing from the spirit of the invention.

Like numerals refer to like parts throughout the several views.

DESCRIPTION OF THE PREFERRED EMBODIMENTS

Figure 1:
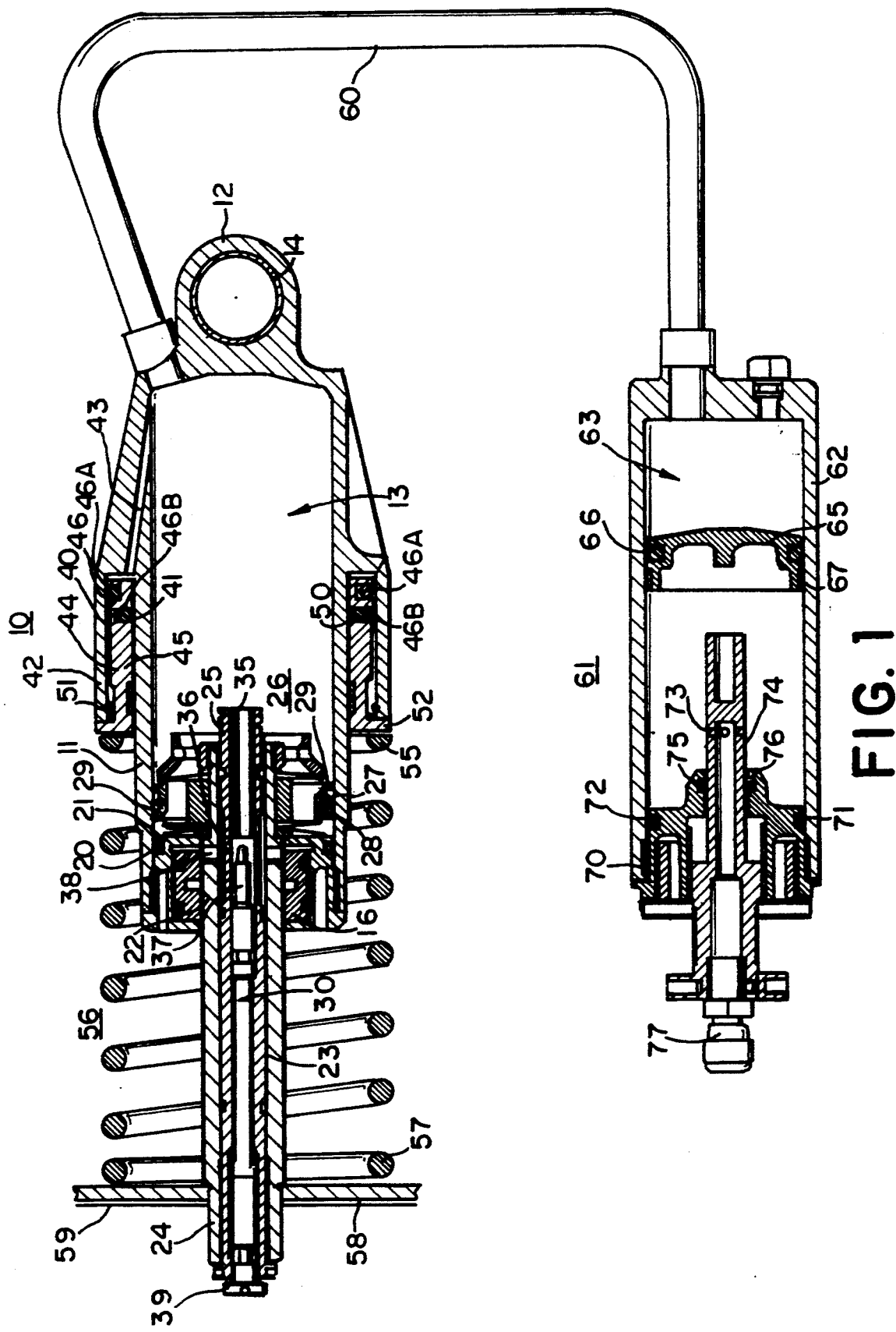
FIG. 1 is a view in partial section, of the bi-linear reactive damper of the invention, in passive condition.
Figure 2:
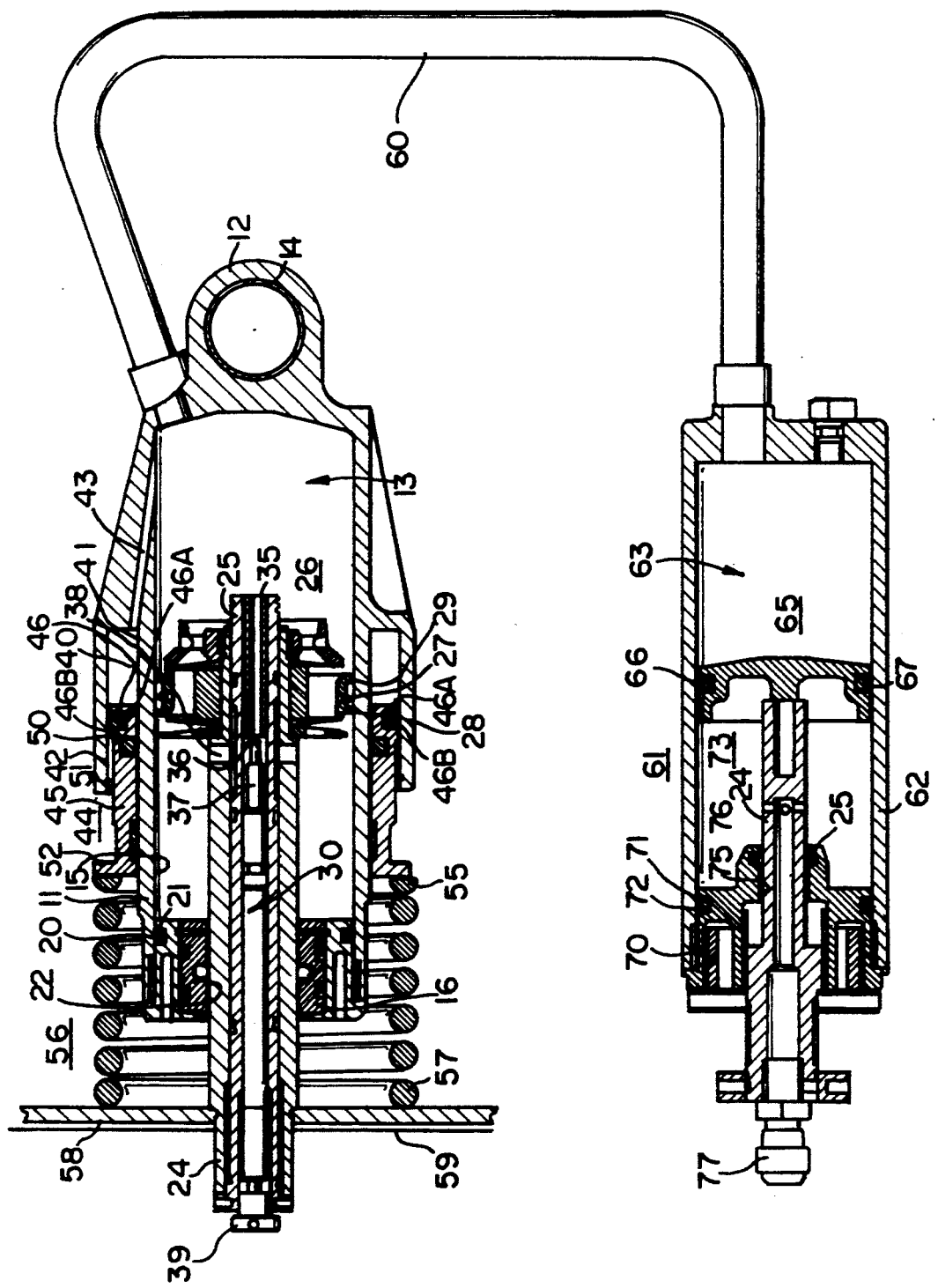
FIG. 2 is a view similar to FIG. 1, illustrating the apparatus in reactive condition.

Referring now more particularly to the drawings and FIGS. 1 and 2 thereof the bi-linear platform reactive damper apparatus 10 is therein illustrated.

The apparatus 10 includes a damper housing 11, which is of generally cylindrical configuration, with a mounting flange 12 at its lower end which can be mounted to a lower suspension component (not shown) of an automotive vehicle by a bolt (not shown) engaged in sleeve 14.

The housing 11 has a damper chamber 13 open at the top with a bore 15, which chamber is normally filled with hydraulic fluid of well known type, and closed off at the top by a plug 16, which may be threadably engaged therewith, and is provided with an o-ring seal 20 in groove 21 in the plug 16 which bears against bore 15.

The plug 16 has a bore 22 with a cylindrical rod 23 therein movable in an axial direction, which rod has its upper end 24 engaged with an upper suspension component (not shown) of a vehicle (not shown).

The rod 23 at its end 25 opposite to end 24 has a damper force generating mechanism or piston 26 thereon, which can be of the well known plate valve type. The piston 26 is of generally cylindrical shape with an outer groove 27 which has an O-ring 28 therein, and with ridges 29 which engage the bore 15 to seal and guide the piston 26 as it travels along bore 15. The rod 23 is hollow, with a bore 30, which has an adjustable fluid flow valve mechanism therein, which includes a hollow sleeve 35 with a seat 36 with which a movable valve 37 is adjustable to control hydraulic fluid flow therethrough and through passageways 38 located between plug 16 and mechanism 26. The valve 37 adjustment may be varied by adjusting an external knob 39 to change the fluid flow rebound force to vary the hardness of the vehicle ride.

The housing 11 has a secondary or platform chamber 40 outside of chamber 13, which is of circular configuration and is formed between the exterior wall 41 of housing 11 and an integral spaced cylindrical shell 42. The chamber 40 is in communication with chamber 13 by passageways 43 for fluid flow therebetween.

A spring platform 44 is provided, which is of "L" shape in cross section with a collar 45 in chamber 40, which collar is of cylindrical configuration with an external groove 46, with an O-ring seal 46A therein bearing against shell 42, and an internal groove 50 with an O-ring seal 46B bearing against wall 41. The collar 45 above seal 46A is of reduced diameter, and engaged by an inwardly extending snap ring 51 carried in shell 42 to retain collar 45 in chamber 40. The platform 44 includes a flange 52 integral with collar 45, which is engaged by one end 55 of a chassis spring 56 of well known type, which is illustrated as a coil type spring. The other end 57 of spring 56 is engaged by spring seat 58 which is in contact with wall 59 of the vehicle suspension (not shown) with which rod 23 is engaged and retained (not shown) in well known manner.

The housing 11 has a hose 60 connected thereto in communication with chamber 13 and connected to a hydraulic fluid reservoir 61, which is of the pressurized nitrogen gas type. The reservoir 61 includes a housing 62 which is mounted to the automotive vehicle (not shown) in well known manner. The housing 62 is open at one end and has a bore 63 with a separator piston 65 therein, which piston is of cylindrical configuration with an external groove 66 with an O-ring seal 67 therein bearing against bore 63. The housing 62 is closed off at its open end by a plug 70 with a groove 71 and an O-ring seal 72 therein which bears against bore 63. The housing 62 is closed off at its open end by a plug 70 which has an external groove 71 with an O-ring seal 72, which is engaged with bore 63 of housing 62 and which carries an adjustable piston stop 73.

The adjustable piston stop 73 includes a rod 74 which is axially movable in a bore 75 in plug 70. The plug 70 has a groove 75 with an O-ring seal 76 which bears against rod 72.

The rod 72 has an adjustment knob 77 which is rotated to vary the position of rod 72 in the bore 63 and accordingly the distance of travel of separator piston 65. The reservoir 61 has pressurized nitrogen gas therein between plug 70 and separator piston 65.

Referring now to FIG. 3 experiments were performed using the rear suspension of a car to determine the measured force deflection response for three different cut-in points, and to determine if there was a step change in force when the weight of the car is supported through the bottomed piston and then supported through hydraulic pressure. The step change in force did not occur. The results which are illustrated in the FIG. 3 graph, which measured force (pounds) versus deflection (inch) for three different reactive cut-in settings demonstrated that there was a smooth transition, and that the deflection of the suspension was within tolerable limits. Based on the experiments it is estimated that the travel of the suspension after the platform is raised should be reacted by a force at a constant rate that is about twice the chassis spring rate.

The mode of operation will now be pointed out.

The damper apparatus in FIG. 1 is shown in assembled condition in an automotive type vehicle. As the load on the chassis spring 56 increases due to an applied aerodynamic force or a movement shift of mass, the damper rod 23 and piston 26 are moved in chamber 13 so that hydraulic fluid in the chamber is forced through hose 60 to reservoir 61 where it acts against separator piston 65, compressing the nitrogen gas until the piston 65 bottoms against stop 73. Further movement forces hydraulic fluid into passageways 43 and platform chamber 40.

Spring platform 44 is forced out of chamber 40 by the fluid acting against the force of the spring 56, and compressing it, with the result that the spring is compressed at both ends providing a greater applied net spring force. Since the damper piston 26 is always passing through hydraulic fluid the damping capabilities are always retained. When the rod applied force is removed, fluid in chamber 40 flows through passageways 43 back into chamber 13 and spring platform 44 moves back into chamber 40 reducing the applied force on spring 56.

It will thus be seen that apparatus has been provided with which the objects of the invention are achieved.

I claim:

1. A bi-linear platform reactive damper apparatus in combination with the suspension of an automotive type vehicle which comprises:

a damper housing mounted to said suspension;
a damper chamber in said housing having hydraulic fluid therein;
a damper piston on said rod in said chamber;
a secondary chamber external to said housing;
fluid communication means connecting said damper chamber and said secondary chamber;
a spring platform in said secondary chamber;
chassis spring means engaged with said platform and said suspension;
a gas pressurized fluid reservoir mounted to said vehicle;
a hose connecting said damper chamber and said reservoir;

said reservoir including a housing open at one end;
a bore in said housing;
a plug closing off the open end of said housing;
a separator piston in said reservoir bore;
piston stop means carried in said plug, and extending into said bore in said housing; and
gas under pressure in said bore between said plug and said separator piston, whereby upon fluid displacement from said damper chamber into said reservoir, said separator piston bottoms on said stop, and further damper fluid displacement flows into said secondary chamber displacing said spring platform, and compressing said spring, providing a greater spring force and reduced overall suspension movement.

2. A bi-linear platform reactive damper apparatus as defined in claim 1, in which:
said damper rod has an adjustable fluid flow valve to vary the damping characteristics of said damper.

3. A bi-linear platform reactive damper apparatus as defined in claim 1, in which:
said separator piston stop is adjustable to change the cut-in point of said spring platform.

4. A bi-linear platform reactive damper apparatus as defined in claim 1, in which:
said chassis spring means is a coil spring.

5. A bi-linear platform reactive damper apparatus as defined in claim 1, in which:
said damper housing is cylindrical;
a cylindrical wall is provided, connected to and spaced from said damper housing forming said secondary chamber;
said fluid communication means is at least one passageway in said housing, for fluid communication between said chambers;
said spring platform is of L-shape, with a collar in said secondary chamber, and a flange extending from said collar to engage said chassis spring means.

* * * * *